United States Patent
Anan

(10) Patent No.: US 9,448,519 B2
(45) Date of Patent: Sep. 20, 2016

(54) MOTOR CONTROL DEVICE AND IMAGE FORMING APPARATUS WITH THE SAME

(71) Applicant: KYOCERA Document Solutions Inc., Osaka (JP)

(72) Inventor: Naohiro Anan, Osaka (JP)

(73) Assignee: KYOCERA Document Solutions Inc., Tamatsukuri, Chuo-ku, Osaka (JP)

(*) Notice: Subject to any disclaimer, the term of this patent is extended or adjusted under 35 U.S.C. 154(b) by 77 days.

(21) Appl. No.: 14/554,752

(22) Filed: Nov. 26, 2014

(65) Prior Publication Data
US 2015/0145447 A1   May 28, 2015

(30) Foreign Application Priority Data
Nov. 28, 2013  (JP) ................................. 2013-246187

(51) Int. Cl.
  H02P 6/12    (2006.01)
  G03G 15/00   (2006.01)
  H02P 6/08    (2016.01)

(52) U.S. Cl.
  CPC .......... G03G 15/55 (2013.01); G03G 15/5004 (2013.01); H02P 6/08 (2013.01)

(58) Field of Classification Search
  CPC ..... G03G 15/55; G03G 15/5004; H02P 6/08
  USPC ............ 318/400.15, 400.26, 400.01, 400.07, 318/700, 800, 811, 721, 400.14, 268, 608; 180/65.1, 65.8; 360/73.03, 70
  See application file for complete search history.

(56) References Cited

U.S. PATENT DOCUMENTS

| | | | | |
|---|---|---|---|---|
| 4,564,792 A * | 1/1986 | Fukushi | ............. | G03B 27/6264 318/400.08 |
| 4,933,985 A * | 6/1990 | Fukushima | ........... | H02P 23/186 318/608 |
| 5,345,532 A * | 9/1994 | Fukushima | ........... | H02P 23/186 318/608 |
| 7,839,113 B2 * | 11/2010 | Maeda | .................... | H02P 21/06 318/700 |
| 8,035,330 B2 * | 10/2011 | Maeda | .................... | H02P 21/06 318/400.01 |
| 8,150,580 B2 * | 4/2012 | Suzuki | .................. | B62D 5/046 701/41 |
| 8,941,350 B2 * | 1/2015 | Otsuka | ................. | H02M 5/293 318/685 |
| 9,190,940 B2 * | 11/2015 | Markham | ................ | H02P 6/08 |

FOREIGN PATENT DOCUMENTS

| | | |
|---|---|---|
| JP | H03-207284 A | 9/1991 |
| JP | 2009-236976 A | 10/2009 |
| JP | 2010-035312 A | 2/2010 |

OTHER PUBLICATIONS

Notice of Reasons for Refusal mailed by Japan Patent Office on Jan. 19, 2016 in the corresponding Japanese patent application No. 2013-246187.

* cited by examiner

Primary Examiner — Rita Leykin

(57) ABSTRACT

A motor control device includes a motor device, a speed command section, and a load detecting section. The motor control device includes: a motor configured to drive a rotating body and output a speed notification signal having an oscillation frequency corresponding to a rotational speed of the rotating body; and a driver IC configured to control a rotational speed of the motor. The speed command section is provided outside the motor device and configured to output a speed command signal designating a rotational speed of the motor to the driver IC. The load detecting section is provided outside the motor device and configured to derive a phase difference between the speed command signal and the speed notification signal and detect a load on the motor based on the phase difference.

5 Claims, 6 Drawing Sheets

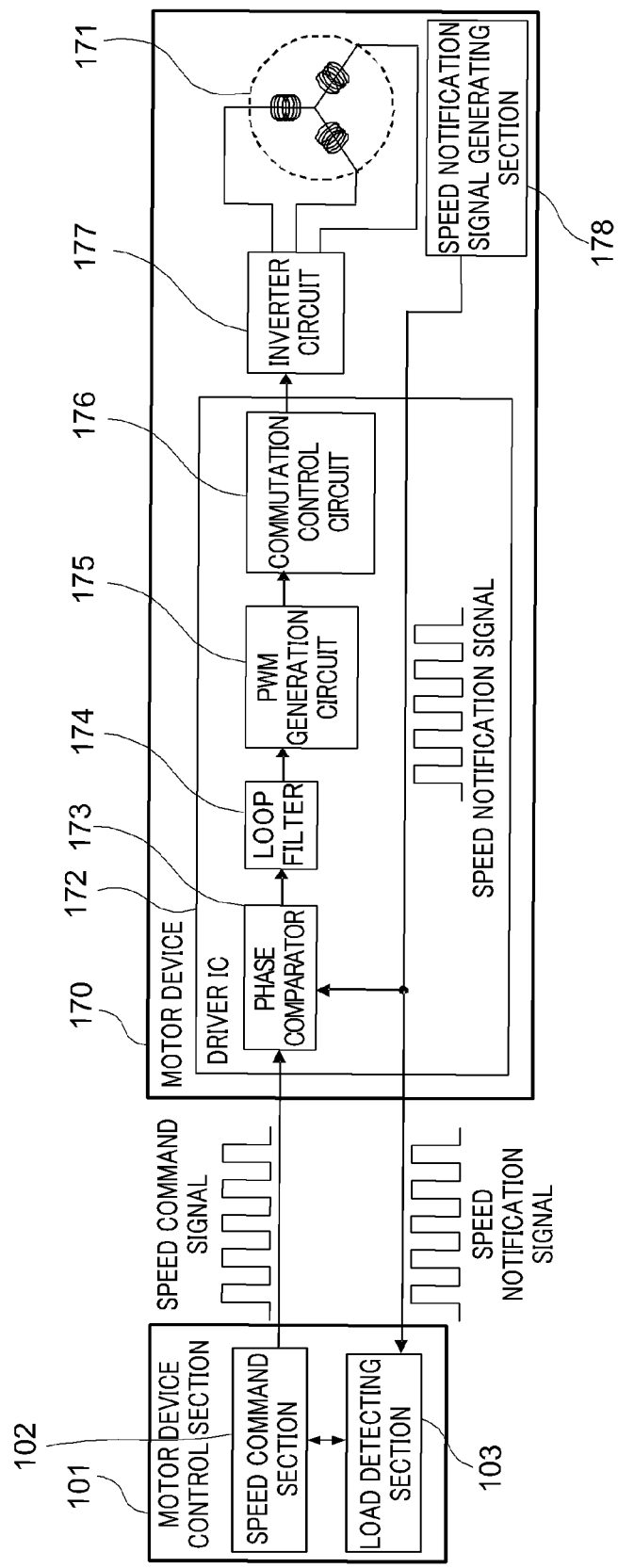

MOTOR CONTROL DEVICE AND IMAGE FORMING APPARATUS WITH THE SAME

INCORPORATION BY REFERENCE

This application claims priority to Japanese Patent Application No. 2013-246187 filed on Nov. 28, 2013, the entire contents of which are incorporated by reference herein.

BACKGROUND

The present disclosure relates to a technique for controlling a motor.

Motor devices have recently become widespread which have a built-in driver IC for controlling the rotation of a motor. In such a motor device, a desired rotational speed of the motor can be obtained by simply inputting a speed command signal designating the rotational speed of the motor into the driver IC from outside the motor device. Therefore, the configuration for controlling the motor can be simplified.

The driver IC of the motor device generally includes a lock signal output circuit for outputting a lock signal. By referring to the lock signal output from the lock signal output circuit, it can be detected whether the motor is rotating or stopping.

However, the above motor device has a problem in that the load on the motor cannot be detected. Although whether the motor is rotating or stopping can be detected by reference to the lock signal, it cannot be detected that an excessive load has been imposed on the motor until the motor stops.

As a solution to this problem, a technique is known for detecting the output current of a motor drive section for driving a motor and determining the load on the motor based on the detected output current.

SUMMARY

A technique improved over the above technique is proposed herein as one aspect of the present disclosure.

A motor control device according to an aspect of the present disclosure includes a motor device, a speed command section, and a load detecting section.

The motor device includes: a motor configured to drive a rotating body and output a speed notification signal having an oscillation frequency corresponding to a rotational speed of the rotating body; and a driver IC configured to control a rotational speed of the motor.

The speed command section is provided outside the motor device and configured to output a speed command signal designating a rotational speed of the motor to the driver IC.

The load detecting section is provided outside the motor device and configured to derive a phase difference between the speed command signal and the speed notification signal and detect a load on the motor based on the phase difference.

Furthermore, an image forming apparatus according to another aspect of the present disclosure includes the aforementioned motor control device.

BRIEF DESCRIPTION OF THE DRAWINGS

FIG. 3 is a block diagram showing the configuration of the motor control device according to the one embodiment of the present disclosure.

DETAILED DESCRIPTION

Hereinafter, a description will be given of a motor control device and an image forming apparatus according to one embodiment of the present disclosure with reference to the drawings.

Figure 1:
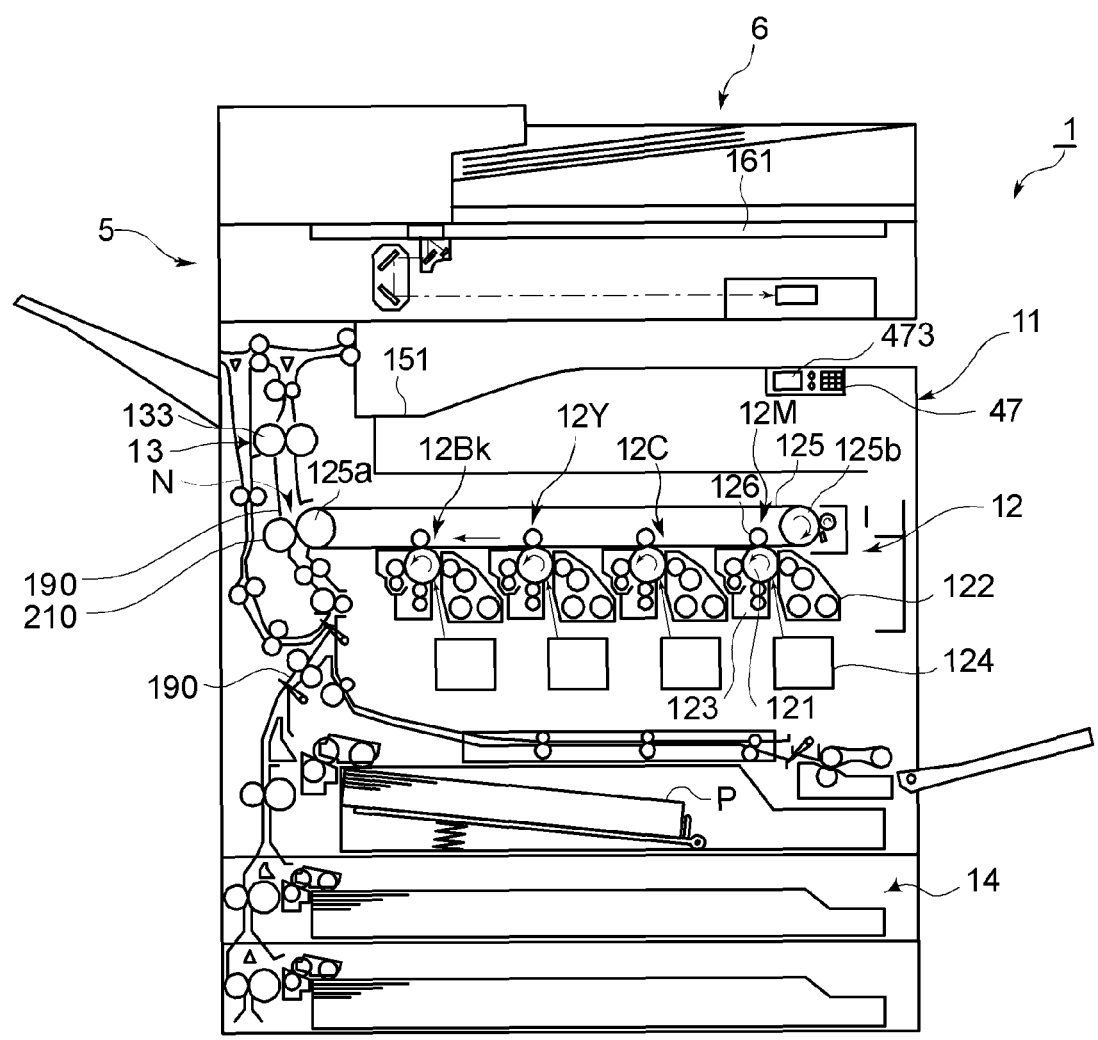
FIG. 1 is a front cross-sectional view showing the structure of an image forming apparatus with a motor control device according to one embodiment of the present disclosure.

FIG. 1 is a front cross-sectional view showing the structure of an image forming apparatus with a motor control device according to one embodiment of the present disclosure.

The image forming apparatus 1 is a multifunction peripheral having multiple functions including, for example, a copy function, a print function, a scan function, and a facsimile function and includes a motor control device according to one embodiment of the present disclosure. The image forming apparatus 1 is made up so that an apparatus body 11 thereof includes an operating section 47, an image forming section 12, a fixing section 13, a paper feed section 14, a document feed section 6, a document reading section 5, and so on.

In a document reading operation of the image forming apparatus 1, the document reading section 5 optically reads an image of an original document being fed from the document feed section 6 or an image of an original document placed on an original glass plate 161 to generate image data. The image data generated by the document reading section 5 is stored on an internal HDD, a network-connected computer or the like.

In an image forming operation of the image forming apparatus 1, the image forming section 12 forms a toner image on a recording paper sheet P serving as a recording medium fed from the paper feed section 14, based on image data generated by the document reading operation, image data stored on the internal HDD or like image data. Each of image forming units 12M, 12C, 12Y, and 12Bk of the image forming section 12 includes a photosensitive drum 121, a charging device 123, an exposure device 124, a developing device 122, and a primary transfer roller 126.

The developing device 122 of each of the image forming units 12M, 12C, 12Y, and 12Bk contains toner for developing an electrostatic latent image. The developing device 122 is configured to supply toner to the surface of the associated photosensitive drum 121 where charging of the charging device 123 and exposure of the exposure device 124 have been completed.

In the case of multicolor printing, the image forming unit 12M for magenta, the image forming unit 12C for cyan, the image forming unit 12Y for yellow, and the image forming unit 12Bk for black of the image forming section 12 form respective toner images on their respective photosensitive drums 121 through charging, exposure, and developing processes based on respective images of respective different color components constituting the above image data and then allow their respective primary transfer rollers 126 to transfer the toner images to an intermediate transfer belt 125 mounted over a drive roller 125a and a driven roller 125b.

The outer peripheral surface of the intermediate transfer belt 125 is set to an image carrying surface to which toner images are to be transferred. The intermediate transfer belt 125 is driven by the drive roller 125a while engaging against the peripheral surfaces of the photosensitive drums 121. The intermediate transfer belt 125 endlessly travels between the drive roller 125a and the driven roller 125b while synchronizing with the rotation of each photosensitive drum 121.

The toner images of different colors transferred to the intermediate transfer belt 125 are superposed each other on the intermediate transfer belt 125 by controlling their transfer timings, resulting in a multicolor toner image. A secondary transfer roller 210 transfers the multicolor toner image formed on the outer peripheral surface of the intermediate transfer belt 125, at a nip N between the secondary transfer roller 210 and the drive roller 125a with the intermediate transfer belt 125 in between, to a recording paper sheet P conveyed from the paper feed section 14 along a conveyance path 190. Thereafter, the fixing section 13 fixes the toner image on the recording paper sheet P by the application of heat and pressure of a fixing roller 133 which includes a heat roller and a pressure roller. The recording paper sheet P having a multicolor image fixed thereon by the completion of the fixing treatment is discharged to a paper output tray 151.

Figure 2:
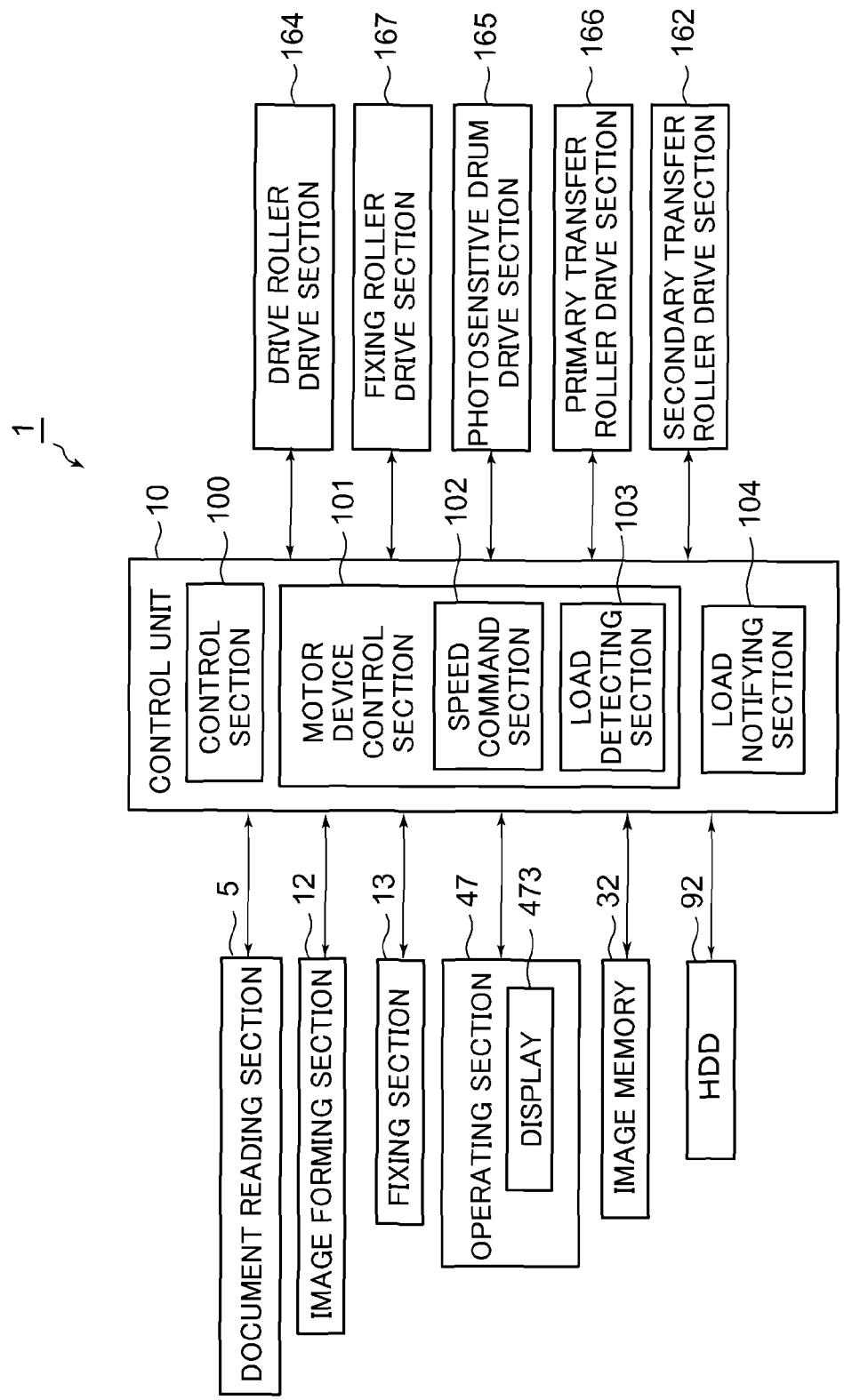
FIG. 2 is a functional block diagram schematically showing an essential internal configuration of the image forming apparatus according to the one embodiment of the present disclosure.

Next, a description will be given of an electrical structure of the image forming apparatus 1. FIG. 2 is a functional block diagram schematically showing an essential internal configuration of the image forming apparatus 1.

The image forming apparatus 1 includes a control unit 10, the document reading section 5, the image forming section 12, the fixing section 13, the operating section 47, an image memory 32, an HDD (hard disk drive) 92, a drive roller drive section 164, a fixing roller drive section 167, a photosensitive drum drive section 165, a primary transfer roller drive section 166, a secondary transfer roller drive section 162, and so on.

The control unit 10 is composed of a CPU (central processing unit), a RAM, a ROM, a dedicated hardware circuit, and so on and governs the overall operation control of the image forming apparatus 1.

The control unit 10 is connected to the document reading section 5, the image forming section 12, the fixing section 13, the operating section 47, the image memory 32, the HDD 92, the drive roller drive section 164, the fixing roller drive section 167, the photosensitive drum drive section 165, the primary transfer roller drive section 166, the secondary transfer roller drive section 162, and so on. The control unit 10 performs the operation control of the above mechanisms connected thereto and signal or data transfer to and from the mechanisms.

The control unit 10 includes a control section 100 governing the aforementioned overall operation control of the image forming apparatus 1. The control section 100 controls the driving and processing of each of the above mechanisms necessary to perform the operation control of each of the scan function, the print function, and the copy function in accordance with a command to execute a job entered by a user via the operating section 47 or the like.

The document reading section 5 includes a lighting part, a CCD sensor, and so on and is configured to, under the control of the control unit 10, read an image from an original document by irradiating the document with light from the lighting part and receiving the reflected light on the CCD sensor.

The image memory 32 provides a region for temporarily storing data on the image read by the document reading section 5 and temporarily storing data to be printed by the image forming section 12.

The image forming section 12 is configured to form an image of print data read by the document reading section 5, an image of print data received from a computer connected via a network, or the like.

The operating section 47 includes a touch panel section and an operating key section which are configured to receive user's commands for various types of operations and processing executable on the image forming apparatus 1. The touch panel section includes a display 473, such as an LCD (liquid crystal display), provided with a touch panel.

The HDD 92 is a large storage device capable of storing document images and the like read by the document reading section 5.

The drive roller drive section 164, the photosensitive drum drive section 165, the primary transfer roller drive section 166, the secondary transfer roller drive section 162, and the fixing roller drive section 167 include their respective motor devices 170 (see FIG. 3) to be described hereinafter. The motor devices 170 operate under the control of a motor device control section 101 of the control unit 10, so that their respective associated rotating bodies, including the drive roller 125a, the photosensitive drum 121, the primary transfer roller 126, the secondary transfer roller 210, and the fixing roller 133, are driven into rotation.

The control unit 10 further includes the motor device control section 101 and a load notifying section 104. The CPU operates in accordance with a touch panel control program stored, for example, in the memory or ROM in the control unit 10 or on the HDD 92, so that the control unit 10 functions as the motor device control section 101 or the load notifying section 104. Alternatively, the control unit 10 may include dedicated hardware circuits or the like corresponding to the above sections 101, 104 to function as each of these sections.

The motor device control section 101 includes a speed command section 102 and a load detecting section 103 and controls the respective motor devices 170 (see FIG. 3) included in the drive roller drive section 164, the photosensitive drum drive section 165, the primary transfer roller drive section 166, the secondary transfer roller drive section 162, and the fixing roller drive section 167.

FIG. 3 is a block diagram showing the configuration of the motor control device according to the one embodiment of the present disclosure. The motor control device according to the one embodiment of the present disclosure includes the motor device control section 101 and the motor devices 170. Although a single motor device 170 is shown in FIG. 3, the motor device control section 101 is actually connected to a plurality of motor devices 170 and controls the plurality of motor devices 170.

The motor device 170 includes a motor 171 which is a brushless motor including an unshown rotor and three drive windings of different phases, i.e., a U-phase, a V-phase, and a W-phase. The three different drive windings are supplied with different drive voltages U, V, and W from an inverter circuit 177.

The motor 171 further includes a speed notification signal generating section 178 configured to generate a speed notification signal having an oscillation frequency corresponding to the rotational speed of the motor 171. The speed notification signal generating section 178 includes an unshown magnet fixed on the outer periphery of the rotor of the motor 171 and an unshown substrate having an FG pattern formed thereon. When the rotor of the motor 171 rotates, an electromotive force is produced on the substrate by electromagnetic induction between the magnet and the FG pattern. The produced electromotive force is converted into a pulse signal by an unshown circuit of the speed notification signal generating section 178 and, eventually, the speed notification signal generating section 178 outputs a so-called FG signal as a speed notification signal.

The motor device 170 further includes a built-in driver IC 172 configured to control the rotational speed of the motor 171. Therefore, a desired rotational speed of the motor 171 can be obtained by simply inputting a speed command signal designating the rotational speed of the motor 171 into the driver IC 172 from the speed command section 102 of the motor device control section 101 provided outside the motor device 170.

The driver IC 172 includes a phase comparator 173, a loop filter 174, a PWM generation circuit 175, and a commutation control circuit 176.

The phase comparator 173 is configured to detect the phase difference between the speed command signal output from the speed command section 102 of the motor device control section 101 and the speed notification signal output from the speed notification signal generating section 178. Then, the phase comparator 173 outputs to the loop filter 174 a pulsed signal corresponding to the phase difference. The loop filter 174 is configured to remove a ripple component of the signal output from the phase comparator 173 to smooth the signal into a DC voltage. The PWM generation circuit 175 is configured to output a PWM signal formed of pulses having a frequency corresponding to the DC voltage output from the loop filter 174. The commutation control circuit 176 is configured to generate, based on the PWM signal output from the PWM generation circuit 175, a commutation signal for controlling the commutation of the inverter circuit 177. Through the operations of the aforementioned circuits in the above manners, the driver IC 172 can maintain the rotational speed of the motor 171 at a rotational speed designated by the speed command signal.

The motor device 170 has an output terminal for use in outputting to the outside of the motor device 170 a speed notification signal output from the speed notification signal generating section 178. The speed notification signal is input via the output terminal into the load detecting section 103 of the motor device control section 101 provided outside the motor device 170.

The load detecting section 103 is configured to detect the load on the motor 171 based on the speed command signal output from the speed command section 102 and the speed notification signal output from the speed notification signal generating section 178.

When the load on the motor 171 becomes high, the actual timing of rotation of the motor 171 is offset from the timing of rotation designated by the speed command signal. Thus, as shown in FIGS. 4A and 4B, a phase difference ($\Delta 1$, $\Delta 2$) occurs between the speed notification signal output from the speed notification signal generating section 178 and the speed command signal output from the speed command section 102.

Figure 4A:
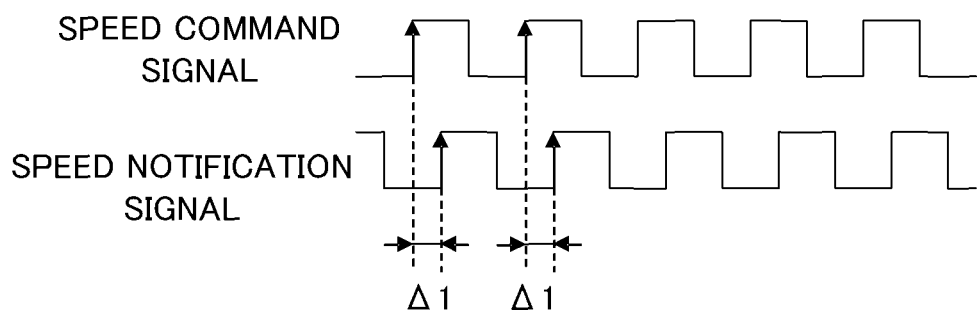
FIGS. 4A and 4B are charts showing examples of a speed command signal and a speed notification signal input to a load detecting section.
Figure 4B:
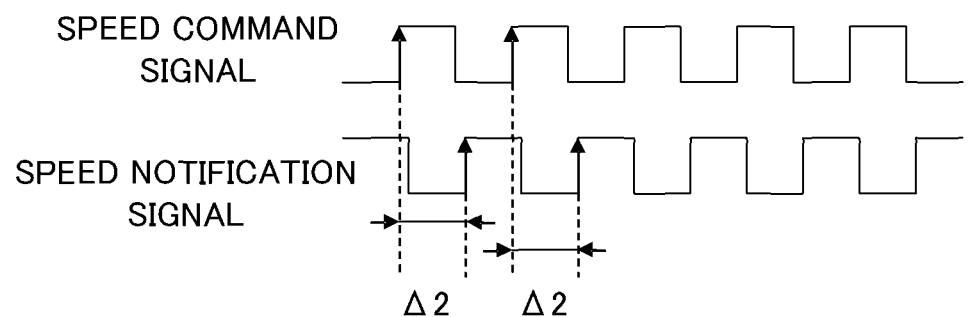

FIG. 4B is a chart showing the speed command signal and speed notification signal input to the load detecting section 103 when the load on the motor 171 is higher as compared to FIG. 4A. As shown in FIG. 4B, the phase difference between the speed command signal and the speed notification signal increases in proportion to the magnitude of the load on the motor 171 ($\Delta 2 > \Delta 1$). Therefore, the load detecting section 103 detects the phase difference between the speed command signal and the speed notification signal as a value relative to the load on the motor 171. Then, the load detecting section 103 outputs the detected value relative to the load on the motor 171 to the load notifying section 104 of the control unit 10.

The load notifying section 104 allows the display 473 of the operating section 47 to display the value relative to the load on the motor 171 output from the load detecting section 103. Furthermore, when the value relative to the load on the motor 171 output from the load detecting section 103 is equal to or greater than a predetermined value, the load notifying section 104 allows the display 473 to display a warning message that the load on the motor 171 is excessive. In doing so, the display 473 serves as a notifying section notifying the user of a predetermined warning.

Figure 5:
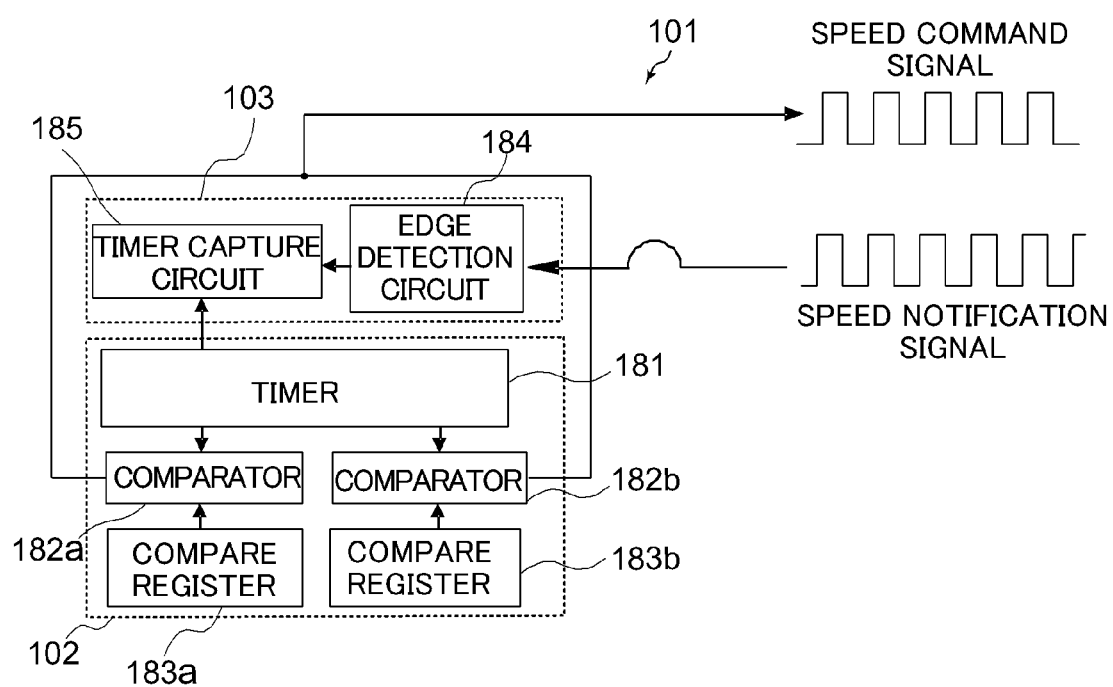
FIG. 5 is a diagram showing a circuit configuration of a motor device control section according to the one embodiment of the present disclosure when composed of hardware circuits, such as an ASIC.

FIG. 5 is a diagram showing a circuit configuration of the motor device control section 101 when composed of hardware circuits, such as an ASIC.

The speed command section 102 of the motor device control section 101 includes a timer 181, a pair of comparators 182a, 182b, and a pair of compare registers 183a, 183b.

The compare registers 183a, 183b store their respective predetermined values.

The comparator 182a is configured to compare the count value of the timer 181 with the value (first comparison value) stored in the compare register 183a. Then, the comparator 182a inverts the output level of the speed command signal with a timing (first timing) at which the count value of the timer 181 agrees with the value stored in the compare register 183a. Furthermore, the comparator 182a resets the count value of the timer 181 with the first timing.

The comparator 182b is configured to compare the count value of the timer 181 with the value (second comparison value) stored in the compare register 183b. Then, the comparator 182b inverts the output level of the speed command signal with a timing (second timing) at which the count value of the timer 181 agrees with the value stored in the compare register 183b. Instead of resetting the count value of the timer 181 with the first timing, the count value of the timer 181 may be reset with the second timing. Through the operations of the aforementioned circuits in the above manners, the speed command section 102 can generate a speed command signal having a desired frequency.

The load detecting section 103 of the motor device control section 101 includes an edge detection circuit 184 and a timer capture circuit 185.

The edge detection circuit 184 is configured to detect a rising edge or a falling edge of the speed notification signal output from the motor device 170.

The timer capture circuit 185 is configured to capture as a value representing the load on the motor 171 the count value of the timer 181 at the point of time when the edge detection circuit 184 detects the rising edge or falling edge of the speed notification signal.

Figure 6:
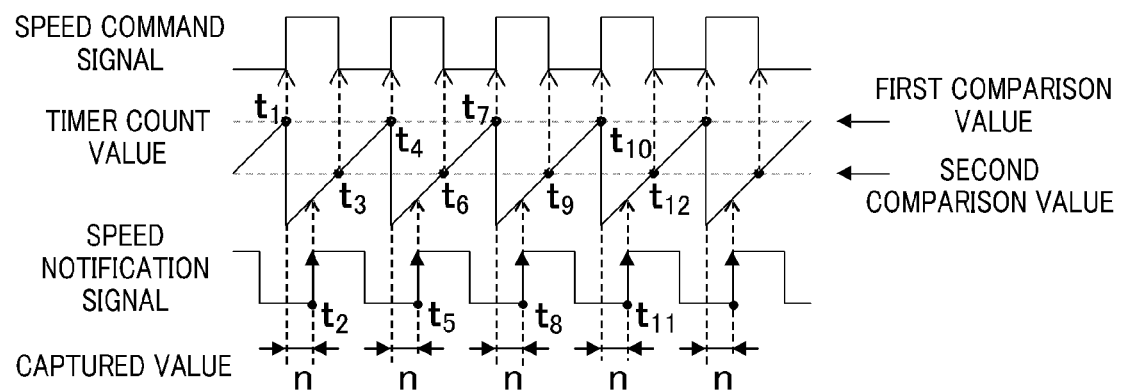
FIG. 6 is a timing chart of the speed command signal, a timer count value, and the speed notification signal.

Next, a description will be given of a specific operation of the load detecting section 103 with reference to FIG. 6. FIG. 6 is a timing chart of the speed command signal, the count value of the timer, and the speed notification signal.

With a timing $t_1$ at which the count value of the timer 181 agrees with the first comparison value stored in the compare register 183a, the comparator 182a inverts the output level of the speed command signal and resets the count value of the timer 181.

On the other hand, the comparator 182b inverts the output level of the speed command signal with a timing $t_3$ at which the count value of the timer 181 agrees with the second comparison value stored in the compare register 183b.

Then, when a timing $t_4$ is reached at which the count value of the timer 181 agrees again with the first comparison value stored in the compare register 183a, the comparator 182a inverts the output level of the speed command signal again and resets the count value of the timer 181 again.

The aforementioned circuits repeat the above operations to generate a speed command signal.

Meanwhile, the timer capture circuit 185 captures the count value n of the timer 181 with a timing $t_2$ at which the edge detection circuit 184 detects the rising edge of the speed notification signal.

Since the count value of the timer 181 is reset with the timing $t_1$, the captured count value n of the timer 181 represents a period of time from the timing $t_1$ to the timing $t_2$. Since the timing $t_1$ is the timing at which the speed command signal rises and the timing $t_2$ is the timing at which the speed notification signal rises, the timer capture circuit 185 can detect the phase difference between the speed command signal and the speed notification signal by capturing the count value n.

(Major Effects of Motor Control Device)

As described previously, the motor control device according to the one embodiment of the present disclosure includes the motor devices 170, the speed command section 102, and the load detecting section 103. The motor device 170 includes: the motor 171 configured to drive a rotating body and output a speed notification signal having an oscillation frequency corresponding to the rotational speed of the rotating body; and the driver IC 172 configured to control the rotational speed of the motor 171. The speed command section 102 is provided outside the motor device 170 and configured to output a speed command signal designating a rotational speed of the motor 171 to the driver IC 172. The load detecting section 103 is provided outside the motor device 170 and configured to derive the phase difference between the speed command signal and the speed notification signal and detect the load on the motor 171 based on the phase difference.

With the above configuration, a speed notification signal corresponding to the rotational speed of the motor 171 is output to the outside of the motor device 170 containing the driver IC 172 and the load detecting section 103 provided outside the motor device 170 detects the load on the motor 171 based on the speed command signal and the speed notification signal. Therefore, the load on the motor 171 can be detected, not with the motor device 170 provided internally with an additional dedicated circuit or the like for detecting the load on the motor 171, but using an existing general motor device. Hence, the structure of the motor control device can be made simpler.

A general motor control device detects the output current of a motor drive section for driving a motor and determines the load on the motor based on the detected output current. However, the general motor control device can detect the load on the motor but has a problem in that because of a poor S/N ratio of the output current of the motor drive section, it requires a filter circuit. Furthermore, because the output current of the motor drive section is low, the general motor control device has difficulty detecting the load on the motor with accuracy. Unlike the general motor control device, in the motor control device according to the one embodiment of the present disclosure, the speed notification signal output from the motor 171 has a good S/N ratio as compared to other signals, such as the output current for driving the motor 171, and therefore the load on the motor can be detected accurately as compared to the general motor control device.

Moreover, in the motor control device according to the one embodiment of the present disclosure, the driver IC 172 controls the rotational speed of the motor 171 based on the speed command signal and the speed notification signal.

With the above configuration, the speed notification signal used by the driver IC 172 to control the rotational speed is also used by the load detecting section 103 to detect the load on the motor 171. Thus, the structure of the motor control device can be simplified.

Furthermore, in the motor control device according to the one embodiment of the present disclosure, the speed command section 102 includes the timer 181, the comparator 182, and the compare register 183. The compare register 183 stores first and second predetermined values. The comparator 182 inverts the output level of the speed command signal with the first timing at which the count value of the timer 181 agrees with the first value stored in the compare register 183 and the second timing at which the count value of the timer 181 agrees with the second value stored in the compare register 183. In addition, the comparator 182 resets the count value of the timer 181 with the first timing or the second timing.

The load detecting section 103 includes the edge detection circuit 184 (edge detecting section) and the timer capture circuit 185 (timer capture section). The edge detection circuit 184 detects the rising edge or the falling edge of the speed notification signal. The timer capture circuit 185 captures as a value representing the load on the motor 171 the count value of the timer 181 at the point of time when the rising edge or falling edge of the speed notification signal is detected.

With the above configuration, the count value of the timer 181 at the point of time when the rising edge or falling edge of the speed notification signal is detected by the edge detection circuit 184 shows the phase difference between the speed command signal and the speed notification signal. Therefore, the timing at which the output level of the speed command signal is to be inverted and the phase difference between the speed command signal and the speed notification signal can be detected using count values of a single timer, resulting in a further simplified structure of the motor control device.

(Other Effects)

In the motor control device according to the one embodiment of the present disclosure, when the value relative to the load on the motor 171 output from the load detecting section 103 is equal to or greater than the predetermined value, the load notifying section 104 allows the display 473 serving as the notifying section to notify the user of a predetermined warning.

With the above configuration, the motor control device can notify the user of an abnormal situation, such as the fact that an unexpected load is being imposed on the motor 171. In the general motor control device, only after the timing has come at which the rotation of the motor stops and a lock signal is thus output, the user can be notified of the fact that an unexpected load has been imposed on the motor. Unlike this, in the motor control device according to the one embodiment of the present disclosure, the user can be notified of the occurrence of an abnormal situation, such as the fact that an unexpected load is being imposed on the motor 171, before the rotation of the motor 171 stops.

Although in the above embodiment the case has been described where the load notifying section 104 performs the notification of a warning by allowing the display 473 built in the image forming apparatus 1 to display a warning message, the present disclosure is not necessarily limited to this case. The load notifying section 104 may perform the notification of a warning by allowing a display outside the image forming apparatus 1 to display a warning message or by allowing a speaker or the like to emit a predetermined warning beep.

(Modifications)

The present disclosure is not limited to the configurations of the above embodiment and can be modified in various ways.

For example, the load detecting section 103 may detect the phase difference between the speed command signal and the speed notification signal plural times and output the average value of the detected plural phase differences as a value relative to the load on the motor 171.

Although the above embodiment has a configuration in which the timer 181 is included in the speed command section 102 of the motor device control section 101, the present disclosure is not necessarily limited to this configuration. For example, the timer 181 may be included in the load detecting section 103 of the motor device control section 101.

Furthermore, the load notifying section 104 may send, via a network to a server or the like, the value relative to the load on the motor 171 output from the load detecting section 103.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A motor control device comprising:
a motor device including a motor configured to drive a rotating body and output a speed notification signal having an oscillation frequency corresponding to a rotational speed of the rotating body and a driver IC configured to control a rotational speed of the motor;
a speed command section provided outside the motor device and configured to output a speed command signal designating a rotational speed of the motor to the driver IC; and
a load detecting section provided outside the motor device and configured to derive a phase difference between the speed command signal and the speed notification signal and detect a load on the motor based on the phase difference,
wherein the speed command section comprises:
a timer;
a compare register storing first and second predetermined values; and
a comparator configured to invert an output level of the speed command signal with a first timing at which a count value of the timer agrees with the first value stored in the compare register and a second timing at which the count value of the timer agrees with the second value stored in the compare register and reset the count value of the timer with the first timing or the second timing, and
the load detecting section comprises:
an edge detecting section configured to detect a rising edge or a falling edge of the speed notification signal; and
a timer capture section configured to capture as a value representing the load on the motor the count value of the timer at a point of time when the rising edge or the falling edge of the speed notification signal is detected.

2. A motor control device comprising:
a motor device including a motor configured to drive a rotating body and output a speed notification signal having an oscillation frequency corresponding to a rotational speed of the rotating body and a driver IC configured to control a rotational speed of the motor;
a speed command section provided outside the motor device and configured to output a speed command signal designating a rotational speed of the motor to the driver IC;
a load detecting section provided outside the motor device and configured to derive a phase difference between the speed command signal and the speed notification signal and detect a load on the motor based on the phase difference; and
a load notifying section configured to, when a value relative to the load on the motor detected by the load detecting section is equal to or greater than a predetermined value, allow an external notifying section or a built-in notifying section to notify a user of a warning.

3. The motor control device according to claim 2, wherein the driver IC controls the rotational speed of the motor based on the speed command signal and the speed notification signal.

4. The motor control device according to claim 2, wherein the speed notification signal is an FG signal output by an FG pattern formed on the rotating body of the motor.

5. An image forming apparatus comprising a rotating body and a motor control device configured to drive the rotating body, wherein the motor control device comprises:
a motor device including a motor configured to drive the rotating body and output a speed notification signal having an oscillation frequency corresponding to a rotational speed of the rotating body and a driver IC configured to control a rotational speed of the motor;
a speed command section provided outside the motor device and configured to output a speed command signal designating a rotational speed of the motor to the driver IC;
a load detecting section provided outside the motor device and configured to derive a phase difference between the speed command signal and the speed notification signal and detect a load on the motor based on the phase difference; and
a load notifying section configured to, when a value relative to the load on the motor detected by the load detecting section is equal to or greater than a predetermined value, allow an external notifying section or a built-in notifying section to notify a user of a warning.

* * * * *